Dec. 5, 1944. G. P. LAMBERT 2,364,081
PROTECTIVE SPRING FOR BOATS AND SMALL CRAFT
Filed June 6, 1939 2 Sheets-Sheet 1
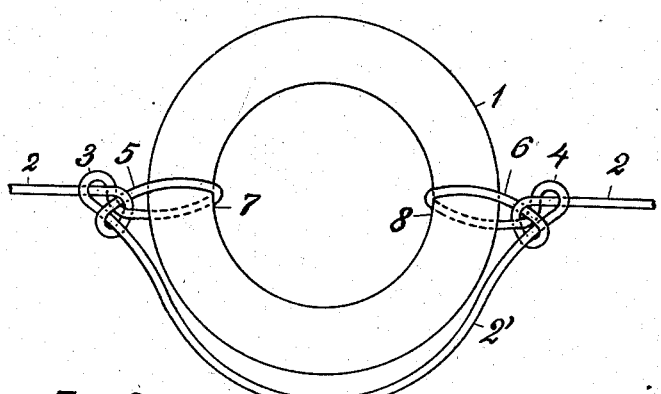
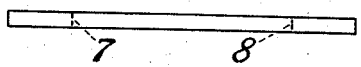
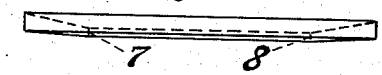
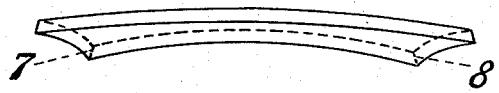
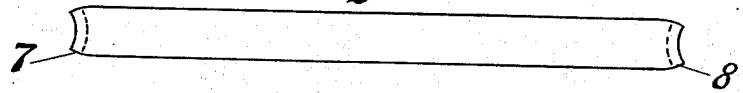
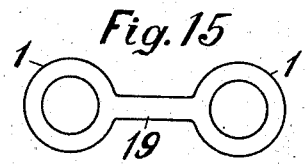
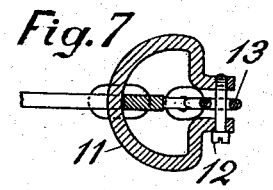
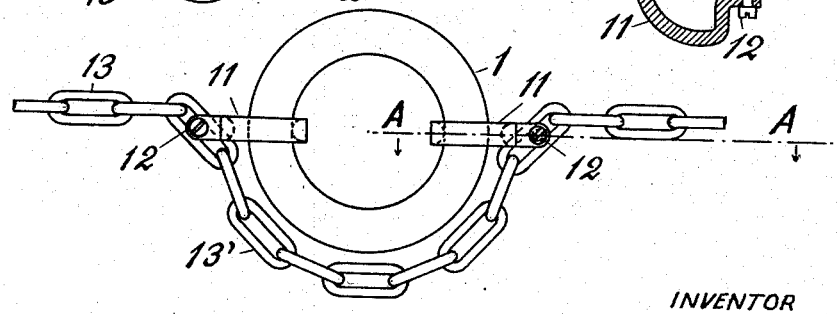
INVENTOR
G. P. Lambert
BY
ATTORNEYS Dec. 5, 1944.    G. P. LAMBERT    2,364,081
PROTECTIVE SPRING FOR BOATS AND SMALL CRAFT
Filed June 6, 1939
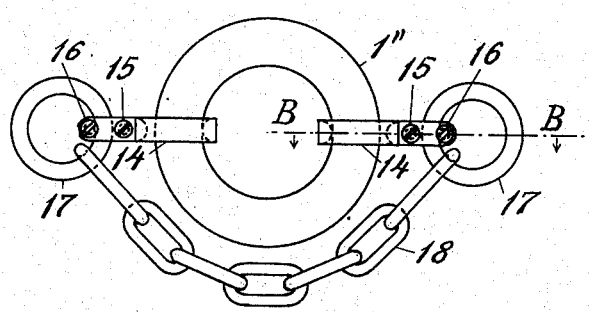
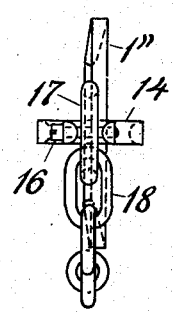
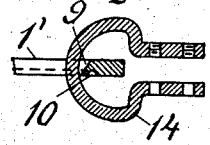
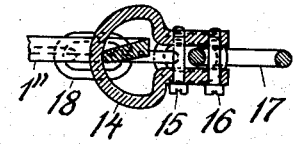
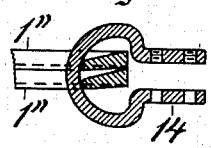
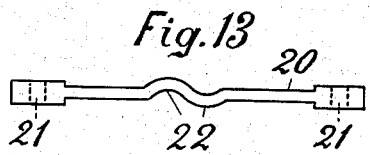
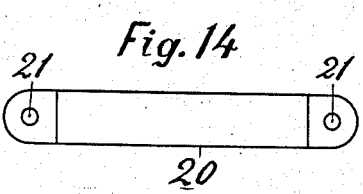
INVENTOR
G. P. Lambert
BY
ATTORNEYS Patented Dec. 5, 1944

2,364,081

UNITED STATES PATENT OFFICE 2,364,081

PROTECTIVE SPRING FOR BOATS AND SMALL CRAFT

Gustaf Paul Lambert, Stockholm, Sweden

Application June 6, 1939, Serial No. 277,585
In Sweden June 10, 1938

8 Claims. (Cl. 267—69)

My invention relates to an elastic device of rubber or other like highly elastic substance, the principal object of which is to make a craft fast to landing stages or the like, or for mooring boats generally. For that purpose cylindrical spiral steel springs have so far generally been used. One drawback of such springs is, however, that they are liable to break suddenly owing to fatigue or even faulty material, and therefore provide insecure protection for the boat. Although an elastic rubber device will in time lose its elasticity, it will not break until the loss of the essential elasticity has become clearly apparent, and has given an opportunity to replace a too old rubber spring by a new spring. In order, however, to avoid too great extension of the rubber spring, this is combined with a stopping device consisting of a bight of rope, chain, wire or the like, attached between the ends of the spring. Owing to the soft consistence of the rubber material, a rubber spring of this nature can also with advantage be permanently attached to the painter, chain, or rope of the boat, making it elastic and rendering unnecessary a special boat-protecting spring fixed to the landing stage. The stopping device of the rubber spring may then expediently consist of a bight of the line or chain or the like attached to the rubber spring. In protective springs, especially for small boats, it is of importance that the initial elastic yield is so easy that even a weak though quick pull on the painter will not jar the points of attachment of the painter. In order to achieve this easy initial yield, the rubber spring is so arranged that a pull on the painter will bend parts of the rubber spring from their initial positions before the rubber really begins to stretch.

The drawings show various different forms of rubber springs and devices for attaching such springs and protecting them from overstrain. Figure 1 is a plan view of a ring-shaped flat rubber spring attached to a painter. Figure 2 is a side view of the rubber ring shown in Figure 1. Figure 3 is a modification of the rings shown in Figures 1 and 2, in which the inner edge is thinner than the outer and slightly displaced relatively to the plane through the outer edge of the ring. Figure 4 is a side view of the rubber ring shown in Figure 1, showing the ring slightly deformed by a pull on the painter. Figure 5 is a side view of the ring shown in Figure 1, showing the ring fully extended. Figure 6 shows the ring shown in Figure 1 attached by means of clamps to a boat chain. Figure 7 is a horizontal section along the line A—A in Figure 6. Figure 8 is a view of a ring-shaped rubber spring provided with clamps, stop chain, and devices for making the arrangement fast to a landing stage or the like. Figure 9 is an end view of the device shown in Figure 8. Figure 10 is part of a section along the line B—B in Figure 8, showing a rubber ring the inner edge of which is bevelled and grooved. Figure 11 is a section along the line B—B in Figure 8. Figure 12 is part of a section along the line B—B in Figure 8, with two rubber rings. Figure 13 is a side view of a rubber spring in the form of a corrugated band. Figure 14 is a plan view of the band shown in Figure 13. Figure 15 is a side view of two flat rubber rings connected by a rod.

In the accompanying drawings, Figure 1 shows one form of the invention according to which the rubber spring is in the form of a flat circular ring, of considerably larger width than thickness, attached to the painter. In Figure 1 the numeral 1 designates the rubber ring to which the painter 2 is fixed by bowline hitches 3 and 4 forming non-slip loops 5 and 6 round the ring 1. The length of the bight 2 of the painter 2 between the bowline hitches 3 and 4 is such that it only permits the extension of the rubber ring 1 far enough to achieve sufficient spring action. A pull in the rope 2 will press the loops 5 and 6 against two diametrically opposed places 7 and 8 on the inner edge of the rubber ring, which edge will therefore be pulled outwards. A slight pull on the painter 2 will cause ring 1 to assume the shape shown in Figure 4. A stronger pull on the painter 2 will cause the ring to assume the shape shown in Figure 5. The nature of this change in the shape of the rubber ring when the painter is pulled makes the initial elastic yield very easy. A sudden jerk in the painter will moreover bring the elasticity into action practically instantaneously, while in cylindrical steel springs the inertia of the mass of the spring must first be overcome by the jerk before the spring begins to give, thus causing a jar at the point where the painter is attached to the boat. The ring is moreover so dimensioned that the transition from light to stronger resistance will be as smooth as possible, or so that it will closely correspond to the elasticity of a spiral spring, that is to say, so that the extension between the places 7 and 8 will be proportionate to the traction. In order to avoid the inner edges of the ring at the two places 7 and 8 bending to opposite sides of the ring and thus being strained more than necessary, the ring is given such a shape that the bending moments acting on the inner edge at 7 and 8 will be directed towards the same side of the ring. This may for instance be achieved by giving the ring a slightly conical shape as shown in Figure 3, or by bevelling its edge as at 9 in Figure 10 or grooving it as at 10. The inner edge of the ring can also expediently be made somewhat thinner than its outer edge, so that, if two or more rings are superimposed on one another as shown in Figure 12 to obtain a stronger spring action, the inner edges of the rings will remain free to ensure great resiliency.

Figure 6 shows the rubber ring combined with a boat chain. The rubber ring 1 is flexibly connected with the chain 13 by the bolts 12 of the clamps 11, the chain 13 forming a bight 13' between the bolts 12.

In order to produce the desired resiliency in the mooring rope or chain of the boat, the rubber spring can also be made fast to the landing stage or the buoy, the painter or chain of the boat being then made fast to the rubber spring. Figure 8 is a plan view of such an arrangement, and Figure 11 is a section along the line B—B in Figure 8. The rubber ring 1" is held by two clamps 14, each with two screw bolts 15 and 16 between which the iron links 17 are held. These links are connected by a stop chain 18 to limit the extension of the rubber ring. One of the links 17 is made fast to the landing stage or to the buoy, while the other link 17 is used for making fast the painter or chain of the boat. To increase the spring action, two or more rubber rings may be superposed in the clamps 14 as shown in Figure 12.

Two or more rubber rings of for instance the type 1, 1', or 1" can also be combined into an elastic band. Figure 15 thus shows two rings 1 connected by a rubber rod 19.

The great initial resiliency of the rubber springs described above is mainly obtained by the inner edges of a more or less flat ring being bent to one side by means of the loops of the painter or the clamps of the chain as the case may be. The same effect can also be obtained by making the rubber spring in the shape of a corrugated band which when pulled will first be more or less straightened out before the band really begins to become extended. Figures 13 and 14 show such a rubber band. The ends of the rubber band 20 are provided with holes 21 for attachment to a chain with clamps like 11 in Figure 6 or to a painter as in Figure 1. The band has two corrugations 22, which are partly stretched by the pull before the band itself is extended.

Having now described my invention, what I claim is:

1. A shock absorber for mooring lines comprising a substantially flat ring of rubber and pulling loops embracing the inner edge of the ring, the cross section of the ring being wider radially than transversely so as to cause the ring, upon being pulled, first to be bent from its inner edge outwardly at the points of engagement of the loops and then to be stretched.

2. A shock absorber consisting of a substantially flat rubber body formed into a plurality of rings connected together in series by portions of the rubber body, pulling loops embracing the inner edges of the outer rings, said rings having zones which on the initial application of tension to said pulling loops cause the ring to be bent from the inner edge outwardly prior to a stretching of the entire ring in the direction of the pull.

3. A shock absorber consisting of pull members, a substantially flat ring of rubber connecting the pull members, the rubber ring having zones which on the initial application of tension to said pull members cause the ring to be bent from its inner edge outwardly then to a stretching of the entire ring in the direction of pull.

4. A shock absorber as claimed in claim 3, in which the cross section of the ring is wider radially than transversely.

5. A shock absorber as claimed in claim 3, in which the cross section of the ring is more than two times wider in a radial direction than transversely thereof.

6. A shock absorber as claimed in claim 3, in which the cross section of the ring is wider radially than transversely and narrower at the inner than at the outer edge.

7. A shock absorber as claimed in claim 3, in which the ring has an inwardly diminishing thickness while the inner edge thereof is set off transversely from the outer edge.

8. A shock absorber comprising pull members, a substantially flat rubber body connecting the pull members and having at least one zone which is subjected first to a change in shape by being bent transversely of the plane of the rubber body on the initial application of tension to said pull members and prior to a stretching of the entire rubber body in the direction of pull.

GUSTAF PAUL LAMBERT.